Nov. 16, 1926.  
F. C. CHADBORN  
1,607,054  
AUTOMATIC HEATING AND VENTILATING SYSTEM  
Filed Oct. 4, 1922  2 Sheets-Sheet 2
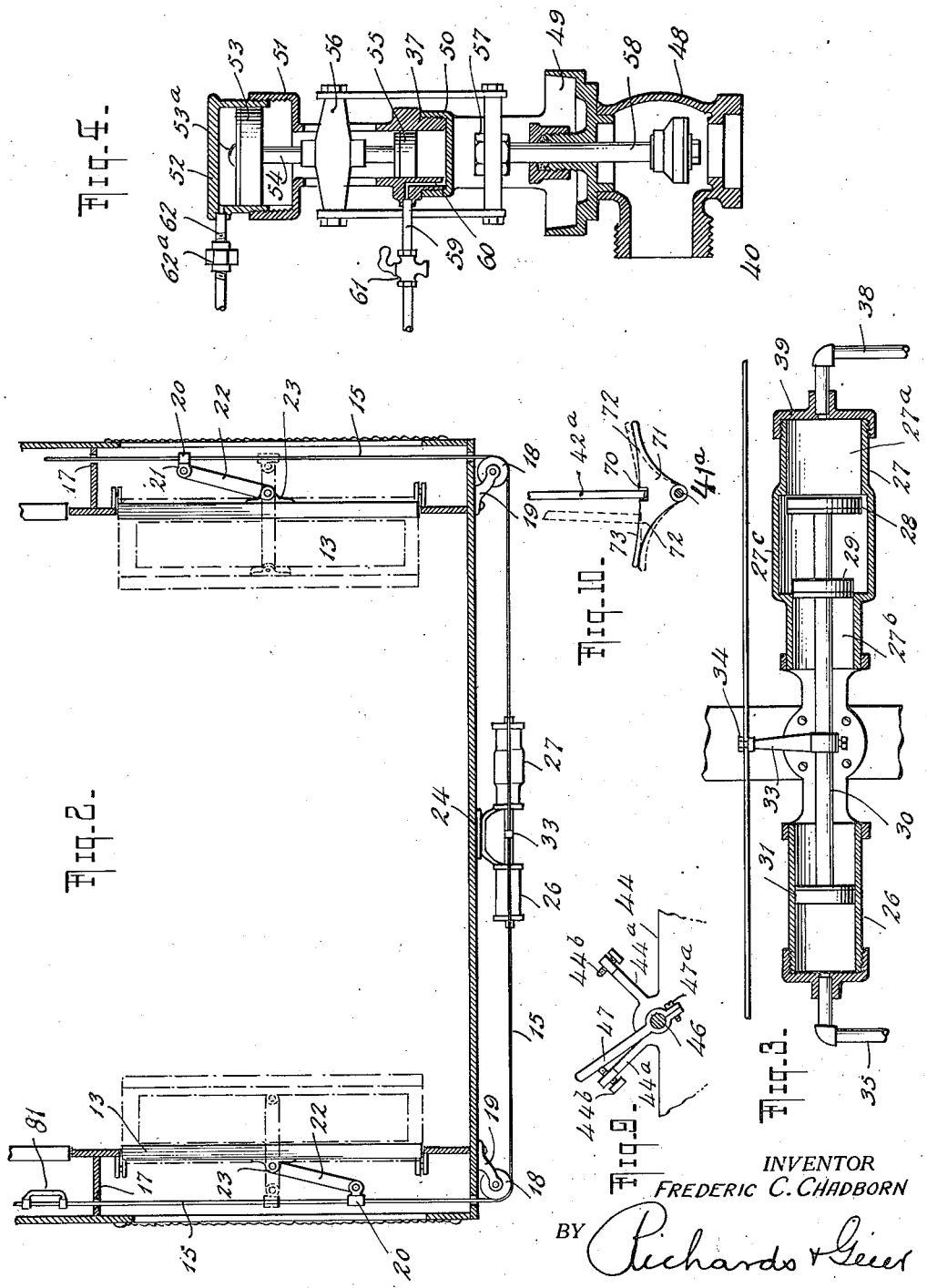
INVENTOR  
FREDERIC C. CHADBORN  
BY *Richards & Geier*  
ATTORNEYS Patented Nov. 16, 1926.

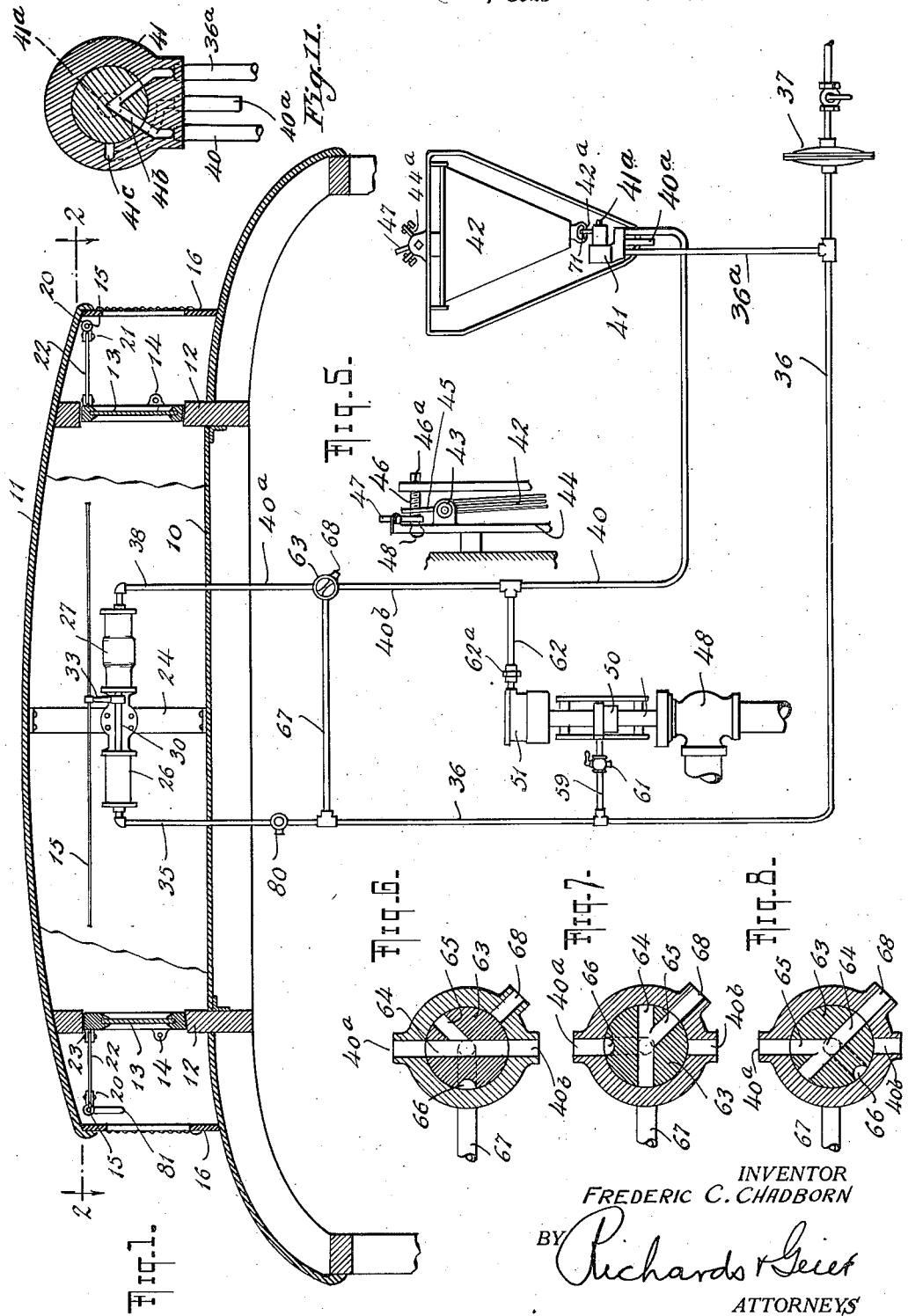

1,607,054

UNITED STATES PATENT OFFICE.

FREDERIC C. CHADBORN, OF NEWBURGH, NEW YORK.

AUTOMATIC HEATING AND VENTILATING SYSTEM.

Application filed October 4, 1922. Serial No. 592,431.

The principal object of this invention is to provide a new and improved system for the automatic control and regulation of a heating and ventilating system particularly adapted for use in combination with the existing equipment of railroad or trolley cars.

Another object is to provide a novel control means for the ventilating and heating means by means of which the various ventilating sashes and heating system valves are operated by a variable pressure to produce a gradual opening or closing of the sashes and valves when actuated by variations caused in a thermostatic control by slight changes in temperature above or below a predetermined point.

A further object is to so construct and mount the thermostatic control that it may be readily set to actuate the heating and ventilating controls at various predetermined temperatures.

Another object is to interpose a manually controlled valve in the piping system so that the ventilating control cylinders may be actuated independently of the automatic control should it be found necessary or desirable. Another object is to provide means for manually operating the control valve for the heating system.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a prefered embodiment of the invention, but it is to be understood that changes, variations and modifications may be resorted to which fall within the scope of the claims hereunto appended.

In the drawings, forming a portion of this specification—

Fig. 1 is a transverse section through the top of a railway car showing the mechanism for actuating the ventilating sashes and illustrating diagrammatically the piping system and location of the thermostatic and heating valve controls.

Fig. 2 is a section taken through the dome of the car on the line 2—2 of Fig. 1.

Fig. 3 is a detail cross sectional view through the fluid pressure control cylinders for the ventilators.

Fig. 4 is a detail cross sectional view through the heating system control cylinders.

Fig. 5 is a detail showing in partial side elevation the mounting for the thermostat and the means for varying the mounting to cause the thermostat to be operative to actuate the system at different predetermined temperatures.

Fig. 6 is a cross sectional detail, showing the position of the manually controlled valve for the ventilating system when the system is operatively connected with the thermostatic control.

Figs. 7 and 8 are views similar to Fig. 6, showing the different positions of the valve when it has been moved to cut out the thermostatic control and actuate the sashes independently.

Fig. 9 is an enlarged detail of the thermostat mounting.

Fig. 10 is an enlarged detail of the connection between the thermostat and the valve controlled thereby; and Fig. 11 is a sectional view of a thermostatically controlled valve employed in connection with the invention.

As shown in the drawings, the numerals 10 and 11 indicate respectively the roof of a railway car and the roof of the dome thereof. Extending between the roofs 10 and 11 are the sash frames 12 in which the sashes 13 are pivotally connected as at 14 upon an axis extending longitudinally of the car. Extending longitudinally of the car and spaced transversely a short distance from the sashes is a cable 15 which is preferably located within the space usually provided in the dome of the car between the sashes 13 and the outer side wall 16 of the dome. The cable passes through suitable apertures 17 drilled in the usual partition members provided in the dome between the sashes and at the four corners of the car suitable sheaved wheels or pulleys 18 are mounted, as by brackets 19, to maintain the cable in position and guide it to the sashes from the fluid pressure control cylinders to be hereinafter described.

Secured at intervals along the cable 15 are a plurality of collars 20, each having a forked arm 21 extending laterally therefrom in which is pivotally mounted one end of a sash actuating arm 22, the other end of which is pivotally connected as by a suitable bracket 23 to a sash 13, it being understood that a collar 20 and arm 22 is provided for operating each sash and the connection to either end of the arm will allow for the radial movement of the sash. Preferably secured within the dome at one end of the car is a bracket 24 upon which is mounted a pair of spaced cylinders 26 and 27, the cylinder 27 being formed of two sections of different cross sectional areas 27ª and 27ᵇ. A common piston rod 30 extends between the cylinders 26 and 27 and has secured thereto, the piston heads 28 and 29 mounted within the cylinder sections 27ª and 27ᵇ respectively, and the piston head 31 mounted within the cylinder 26. As the opposed ends of the pistons 29 and 31 are never subjected to pressure, the opposed inner ends of the cylinders 26 and 27 are open and the use of stuffing boxes or packing is therefore avoided. It will be noted that cylinder section 27ª is of greater cross sectional area than cylinder section 27ᵇ and that this section in turn is greater in cross sectional area than cylinder 26 for a purpose which will hereinafter appear. The cylinder 27 is of stepped construction being widened out as at 27ᶜ to form two portions of different cross sectional areas one of which is substantially equal to the cross sectional area of piston 29 and the other of which is greater than the area of piston 29.

Secured to the piston rod 30 between the cylinders 26, 27 is an arm 33 secured at its outer end by any suitable clamping means such as indicated at 34 to the cable 15, to communicate to the cable and therefore the ventilating sashes, the movements of the pistons which in turn are controlled in a manner to be hereinafter set forth.

A fluid under constant pressure is supplied to the cylinder section 26 and piston head 31 through a pipe 35 which is connected to cylinder 26 and communicates through supply pipe 36 with the main compressed air supply line, a suitable filter 37 being interposed between the main air line and pipe 36.

Means to supply a variable fluid pressure under thermostatic control to the cylinder section 27ª and piston heads 28 and 29 are provided and comprises the pipe 38 secured to cylinder head 3 and communicating through pipe 40 and the thermostatically controlled valve 41 with supply pipe 36. A thermostat 42 comprising a plurality of plates secured together is pivoted as at 43 (Fig. 5) to bracket 44 which is secured at any suitable point within the car. Extending upwardly from the plates beyond the axis of pivots 43 is an ear 45 which is provided with a threaded aperture in which is received the screw 46, having its inner end swivelled as at 48 in the bracket 44 and provided at its outer end with a squared head 46ª with which a suitable key or wrench may be engaged. Adjacent the bracket 44 an actuating handle 47 is secured to the screw 46 by means of a split boss provided with a screw 47ª to clamp the handle to the screw 46 and to permit the handle 47 to be loosened thereby permitting screw 46 to be turned and thus by changing the angular position of the thermostatic plates produce a different relation between the thermostat and valve 41.

The thermostat is of the type wherein a plurality of plates constructed of sheets of materials having different coefficients of expansion are riveted together, whereby a curling of the composite plates is caused by variations of temperature. The lower end of the thermostat is provided with a downwardly extending tongue 42ª adapted to engage in a slot 70 (see Fig. 10) provided in a member 71, suitably secured to the valve stem 41ª of valve 41. The member 71 on each side of slot 70 is provided with an upwardly extending fin 72 having on its upper side an arcuate face 73 the radius of whose curvature is substantially equal to the distance from the pivotal support 43 of the thermostat to the face 73. Projecting outwardly from bracket 44 are a pair of lugs 44ª (see Fig. 9) in each of which is mounted a stop screw 44ᵇ, to provide adjustable means for limiting the movement of the handle 47. By turning the handle 47 to either of the limits defined by the stop screws 44ᵇ it will be obvious that the relation of the lower end of the thermostat to the member 71 will be varied, the tongue 42ª moving to the right or left (Fig. 10) of the slot 70 according to the direction in which the handle 47 is actuated. Preferably the thermostat will be set so that tongue 42ª will occupy the full line position shown in Fig. 10 for a temperature of 70° when the handle 47 is in engagement with one of the stop screws 44ᵇ and to occupy the dotted line position when the handle is moved to abut the other stop screw. The latter stop screw is preferably adjusted to cause the thermostat to operate the valve at a different temperature, for example 50°, this being desirable when the car is lying idle in the yards, thus avoiding unnecessary waste of heat. Thus the tongue 42ª is utilized to control the operation of the valve 41, as shown in Fig. 11. In this figure, the rotary member of the valve is illustrated as having an angular passage 41ᵇ which is indicated in position to establish communication from the main line pressure supply pipe 36, through the branch 36ª, to the pipe 40 so that pressure may be conveyed to the cylinder section 27ª and to the main control valve 48, presently to be described, in order to lower the temperature in the car. As the temperature decreases and approaches the predetermined or normal temperature, as described above, the valve is rotated in a clockwise direction, as viewed in Fig. 11, by the movement of the tongue 42ª from the dotted-line position in Fig. 10 toward the full-line position. This movement of the valve brings the ends of the passage 41ᵇ out of register with the ports in the valve body communicating with the pipes 36ª and 40 so that the pressure is shut off from the cylinder section 27ª and the main control valve.

If the temperature continues to fall below normal a further movement of the valve in the direction indicated above causes the ends of the passage 41ᵇ to align the exhaust port 41ᶜ and the pipe 40, thus permitting pressure in the cylinder section 27ª to escape through the pipe 40 and valve 41 into the atmosphere through the exhaust pipe 40ª.

The main control valve 48 (see Figs. 1 and 4) for the heating system has secured thereto a fluid pressure control means similar to that shown for the ventilating sashes and comprises a bracket 49 which is screwed to the valve casing of valve 48 to replace the usual valve bonnet. Carried by the bracket 49 are a pair of spaced axially aligned cylinder sections 50 and 51. The upper cylinder section 51 is internally threaded to receive an externally threaded annular flange projecting downwardly from cylinder head 52, the interior of the annular flange forming a cylinder in which is slidably received the piston head 53, secured upon piston rod 54, which extends downwardly into cylinder section 51 and has secured thereto the piston head 55. Fastened to piston rod 54 intermediate the cylinder sections is the upper end of a yoke 56, the lower end of which is secured as at 57 to the upper end of valve stem 58. Cylinder section 50 has secured thereto pipe 59 which communicates through conduit 60 with the lower portion of the said cylinder section and supplies fluid under constant pressure to the under face of piston head 55, pipe 59 being connected to supply pipe 36, and having valve 61 interposed between cylinder section 50 and supply pipe 36.

Secured to cylinder head 52 is a pipe 62 through which fluid under variable pressure is supplied from pipe 40 controlled by thermostat 42 and valve 41. A detachable union 62ª is placed in pipe 62 adjacent cylinder head 52 to permit pipe 62 to be disconnected in cases of emergency thereby allowing cylinder head 52 to be screwed downwardly and by exerting a thrust against projection 53ª of piston head 53 will cause valve 48 to be closed.

An emergency manually controlled valve 63 is placed within pipe 40 and serves to permit control of the fluid pressure ventilating sash operating means independently of the thermostat in a manner which will be hereinafter set forth. A relief valve 80 is also placed in the constant pressure pipe line adjacent to cylinder 26 to permit the cable 15 to be directly actuated by hand in case the air pressure should fail through any cause, a hand grip 81 being secured to the cable at any conveniently accessible point, so that by merely opening valve 80 to permit the air in cylinder 26 to escape cable 15 may be pulled to open the ventilators.

The operation of the system is as follows, the thermostat 42 is constructed to cause the lower ends of the plates to move transversely of the pivotal axis 43 under variations in temperature and is preferably arranged to cause the valve 41 to be held in a neutral position at a predetermined temperature, for example 70°. Assuming that the temperature shall rise above the predetermined point the valve 41 is opened by the thermostat to establish communication between the main air line and the pipe 40, the air under pressure seeping to the cylinder section 51 of the heating valve control through pipe 62 and also entering cylinder section 27ª of the ventilator control. As the areas of pistons 53 and 28 are greater than those of pistons 55 and 31 respectively, the constant pressure against pistons 55 and 31 will be overcome, valve 48 will be actuated to cut off the heat supply and cable 15 will be actuated to open the ventilators, it being understood that the collars 20 will be secured to the cable 15 at the required points necessary to cause the collars to be brought into substantial transverse alignment with the brackets 23 by the full extent of the travel of the pistons, thus causing the sashes to be swung inwardly about their pivots to the dotted line positions indicated in Fig. 2. As the temperature drops, due to the closing off of the heat and the opening of the sashes, the thermostat will cause the valve 41 to move to its neutral position holding the heat valve closed and sashes open until the thermostat causes the valve 41 to move past neutral and allow the pressure in cylinders 27 and 51 to escape to the atmosphere, the constant pressure in cylinders 50 and 26 then causing the pistons 55 and 31 to first close the ventilators and then open the heating valve.

As it is only necessary to keep the temperature within the cars at a much lower degree when the cars are lying idle in the yards, the means 46 to 48 inclusive for varying the angular position of the thermostat are provided and by manually actuating the handle 47 the screw 46 is operated to swing the thermostat upon its pivotal axis 43 and to move the tongue 42ª on the lower end of the thermostat with relation to the valve 41, to the dotted line position shown in Fig. 10 thereby actuating the valve 41 to cause the heat control valve to be closed and the ventilators opened and reduce the temperature. When the relative position of the thermostat and valve have been changed to this new position, the thermostat will then cause the valve to be actuated by temperature variations above or below a new predetermined normal or lower temperature. When the car is to be used for conveying passengers the handle 47 is again set to cause the thermostat to be operative at the higher temperature, it being understood that suitable means may be provided for indicating the different operative points of the thermostat.
Complete flexibility of the system is provided enabling it to be set for actuation at any desired temperature, which setting can be instantly varied to either a maximum or minimum normal for example 70° and 50° by merely actuating the handle 47 to either of the limits defined by the stop screws 44ª. The temperature differences between the maximum and minimum points can be varied as desired by the adjustment of the screws 44ª, the maximum and minimum limits may be changed without varying the temperature difference thereof by adjusting the screw 46 relatively to the handle 47 without changing the adjustment of the screws 44ª and finally both the adjustment of the screws 46 and 44ª may be changed to vary both the maximum and minimum points as well as the temperature differences between these points.
The valve 41 is constructed to permit only a seepage of the air under pressure to the fluid pressure actuated means in order that a gradual actuation of the heat and ventilator control will be accomplished and also to prevent unnecessary waste of the air supply. This gradual operation of the heat and ventilator controls is further accomplished by the stepped construction of the cylinder 27, it being obvious that when the air is admitted to the cylinder 27 through pipe 38, as piston 28 is of greater cross sectional area than piston 31 the piston rod 30 will move towards the left (Fig. 3). As piston 28 reaches the widened part 27ᶜ, piston 29 will be engaged with cylinder section 27ᵇ and as the movement of the piston rod towards the left continues and piston 28 passes into the widened part, the air under pressure will rush past piston 28 and impinge against piston 29 and it will be obvious that the movement of the piston rod and also of the cables will be checked and if the temperature continues to rise the ports of the valve 41 will be opened wider by the thermostat, increasing the pressure within cylinders 27 and continuing the movement towards the left, this construction therefore producing a differential movement of the parts.

Attention is called to the fact that the difference between the cross sectional areas of the constant and variable pressure cylinders for the ventilator control is less than the difference between these cylinders for the heat valve control. It will therefore be seen that when valve 41 is opened to exhaust the air pressure from cylinders 51 and 27, the opening of the heat valve will lag behind the closing of the ventilators due to these differences in relative areas of the piston members of each respective group. During the reverse operation, viz, when the valve 41 is actuated to admit the variable pressure to the cylinders 51 and 27, the opposite effect will be obtained, heat valve 48 closing first before the ventilators are opened. It will thus be seen that while the air is admitted simultaneously by a single control to each of the fluid pressure actuated devices, the effective pressures due to differences in areas causes the one operation to be completed before the other when the parts are being moved by pressure in one direction and when the pressure conditions in the fluid pressure control system are reversed the opposite effect is produced. It will thus be seen that any desirable timed operation of any number of actuating devices can be obtained by a single controlling device by an application of the principles herein disclosed.

While I have shown the cylinder section 51 of uniform cross sectional area, it will be obvious that the same principles of construction as shown in connection with the ventilator control to produce a differential movement thereof may be used for the heat valve, and vice versa. The showings in Figs. 3 and 4 are therefore to be construed as covering different modifications of the principles of construction of the controls which are equally applicable in either form of either control.

If for any reason it becomes necessary or desirable to operate the ventilators independently of the thermostatic control, the manually operable valve 63 is provided. As shown in Figs. 6 to 8 inclusive, this valve is provided with the conduit 64 having a branch passage 65 leading therefrom and a conduit 66 located in one side and extending transversely of the conduit 64 and longitudinally of the valve. The conduit 66 is adapted to place upper section 40ª of pipe 40 which leads to the variable pressure cylinder sections 27 in communication with the pipe 67 connected to the constant pressure pipe, the pipe 67 being connected to the valve behind and in alignment longitudinally of the valve with the section 40ª. Conduits 64 and 65 are adapted to place pipe section 40ª in communication with section 40ᵇ of the variable pressure supply or with the atmosphere through a port 68 in the valve casing. Fig. 6 shows the normal position of the valve 63 in which the thermostatic control is operatively connected to the ventilator controls, the variable pressure pipe sections 40ª and 40ᵇ being in communication through conduit 64. If it is desired to open the ventilators independently of the thermostat the valve 63 is turned to the position shown in Fig. 7 in which position conduit 66 is connecting the constant pressure supply to the ventilator control through pipes 67 and 40ª, and the conduits 64, 65 are inactive. If the ventilators are to be closed by means of valve 63 the valve is turned to the position shown in Fig. 8 connecting the pipe section 40ª to the atmosphere through conduits 64, 65 and port 68, thus releasing the pressure in cylinder section 27, and permitting the constant pressure supply to actuate piston 31 to move cable 15 to close the ventilators.

While I have shown my automatic ventilating and heat controlling system as applied to a railway car, it will be obvious that the system is of general application and that it can be used for any type of structures such as greenhouses, vessels, public assembly halls, such as theatres, churches, etc., workshops or any other buildings or structures wherein it is desirable to maintain a uniform regulated temperature.

It will be obvious that the constant pressure could, if desired, be used to produce the opening movement of the sashes and the closing of the heat control valves.

For the purposes of the present disclosure, I have only shown a single heating system control valve, but it will be obvious that any desirable number of control valves can be simultaneously actuated by merely providing each valve with an attachment such as shown in Fig. 4 and that my invention is to be construed as applicable equally to a plurality of heat regulating means or controls.

Having thus described my invention, what I claim as new and desire to secure by Letters Patent, is:

1. An automatic heating and ventilating system comprising heat regulating means, ventilating means, separate fluid pressure actuated means to operate each of the aforementioned means and a single controlling device for simultaneously governing said fluid pressure means, said fluid pressure means constructed and arranged to cause said heat regulating means and said ventilating means to operate at different speeds.

2. An automatic heating and ventilating system comprising heat regulating means, ventilating means, separate means constructed and arranged to operate said heat regulating means and ventilating means at different speeds and a single controlling device to simultaneously actuate said separate means 3. An automatic heating and ventilating system comprising heat regulating means, ventilating means, separate means constructed and arranged to operate said heat regulating and ventilating means at different speed ratios when moving in one direction and in inverse speed ratios when moving in the opposite direction and a single controlling device to simultaneously actuate said separate means.

4. An automatic heating and ventilating system comprising heat regulating means, ventilating means, a fluid pressure device to operate said heat regulating means, a fluid pressure device to operate said ventilating means, each of said fluid pressure devices comprising a plurality of cylinders and pistons of different cross sectional areas arranged to present different effective working areas to pressure from opposite directions, the difference between the areas of the pistons of one of said devices being greater than the difference between the areas of the pistons of the other device and a single controlling means to admit fluid under pressure simultaneously to said devices.

5. In an automatic heating and ventilating system, means for controlling the heating and ventilating means of the system, a thermostat to govern said controlling means, means to mount said thermostat in operative relation to said controlling means, and means to adjust the mounting means to change the relative position of said thermostat and controlling means whereby said thermostat will be operative to actuate said controlling means at different temperatures.

6. An automatic heating and ventilating system as set forth in claim 5 in which stop means are provided to limit the movement of the means for adjusting the thermostat mounting at different points corresponding to predetermined maximum and minimum temperatures.

7. In an automatic heating and ventilating system, means for controlling the heating and ventilating means of the system, a thermostat to govern said controlling means, means to mount said thermostat into operative relation with said controlling means, means to adjust the mounting means to change the relative position of said thermostat and controlling means whereby said thermostat will be operative to actuate said controlling means at different temperatures, and stop means to limit the movement of the means for adjusting the thermostat mounting at different points corresponding to predetermined maximum and minimum temperatures, said stop means being adjustable to independently vary the points of predetermined maximum and minimum temperatures.

8. An automatic heating and ventilating system as set forth in claim 5 in which operating means are provided for the mounting adjusting means, means to change the relative positions of said operating means, and mounting adjusting means, whereby the relative positions of the thermostat and valve may be changed to vary the points of maximum and minimum temperature without changing the temperature difference between said points.

9. An automatic heating and ventilating system as set forth in claim 5 in which the means to adjust said mounting means comprises means to set said mounting means to various points for predetermined maximum and minimum temperatures, means for varying said points to set said mounting means for various temperature differences between said maximum and minimum points and means to vary said maximum and minimum points without changing the temperature difference thereof.

10. An automatic heating and ventilating system comprising heat regulating means, ventilating means, a fluid pressure device to operate said heat regulating means, a fluid pressure device to operate said ventilating means, each of said fluid pressure devices consisting of a set of spaced cylinders of different cross sectional areas, one of said cylinders having a widened section intermediate its ends, a common piston rod for each set of cylinders, a plurality of pistons mounted upon said piston rod, means to supply a fluid under pressure to said cylinders, certain of said pistons being of smaller cross sectional area than said widened section and being movable longitudinally into said widened section, whereby a differential movement of said piston rod is produced.

11. An automatic heating and ventilating system comprising heat regulating means, ventilating means and fluid pressure means to operate said heat regulating and ventilating means, said fluid pressure means constructed and arranged to produce a differential operation of said heat regulating and ventilating means.

12. A heating and ventilating system comprising heat regulating means, ventilating means, a fluid pressure device for operating said ventilating means, said fluid pressure device comprising a pair of spaced axially aligned cylinders, one of said cylinders consisting of a pair of end cylinder sections of different cross sectional areas, and a widened section of greater cross sectional area between said end sections, a common piston rod, a piston mounted on said rod in each of said end cylinder sections, said pistons being of substantially equal cross sectional area to its respective end cylinder section and means for supplying fluid under pressure to said cylinders to cause longitudinal reciprocations of said piston rod, and said widened intermediate section permitting a momentary release of said pressure whereby the reciprocation of said piston rod is checked at an intermediate point to produce a differential movement of said piston rod.

13. A heating and ventilating system comprising heat regulating means, ventilating means, a fluid pressure device for operating said ventilating means, said fluid pressure device comprising a first cylinder, means to supply a fluid under constant pressure to said first cylinder, a second cylinder in axial alignment with and spaced from said first cylinder, means to supply a fluid under variable pressure to said second cylinder, said second cylinder comprised of a plurality of end sections of different cross sectional areas, and a section of greater cross sectional area intermediate said end sections, a piston rod common to said cylinders, a plurality of pistons secured to said piston rod and mounted within said cylinders, one of said pistons being mounted within said first cylinder and the remaining pistons being adapted to be operatively engaged within the end sections of said second cylinder and to be moved into said widened intermediate section by said pressures, whereby a differential movement of said piston rod is produced.

In testimony whereof I have affixed my signature.

FREDERIC C. CHADBORN.